INVENTORS
KENT M. MACK
CARL C. FRANKENFIELD
BY B. L. Zangwill
ATTORNEYS

United States Patent Office 2,975,416
Patented Mar. 14, 1961

2,975,416
CONTINUOUSLY VARIABLE RANGE CIRCUIT

Kent M. Mack, North Linthicum, and Carl C. Frankenfield, Baltimore, Md., assignors, by mesne assignments, to the United States of America as represented by the Secretary of the Navy Filed Apr. 27, 1955, Ser. No. 504,393

2 Claims. (Cl. 343—17.1)

This invention relates to a radio detection and ranging system in which pulses are periodically transmitted and reflected from objects in space to be received and displayed on an indicator.

In a common type of radar range indicator it is necessary to deflect the electron beam of a cathode ray tube. A pulse of energy variable linearly with respect to time, known as a sawtooth wave, is used to deflect the beam. When a plurality of ranges is provided in a radar system it is of course necessary to change or switch from one range to another and it is not uncommon in practice for an operator to lose a target when such switching is done. In the above mentioned sawtooth waveform its height corresponds to the radius of the cathode ray tube and its length is made to correspond to the range that is to be detected. In order to detect a target at various distances, say two miles, or 160 miles, or any range in between, the sawtooth waveform must be varied whereby its length is changed while its height is maintained constant. The slope of the sawtooth is thereby changed. In the instant invention, the form of the sawtooth wave is controlled by connecting an attenuator circuit to the output of the sawtooth generator which takes a fixed sawtooth pulse and attenuates it continuously until the maximum range is reached. The height of the sawtooth is kept constant by a blocking diode whose cathode is biased to a definite D.C. potential. The sawtooth builds up until it exceeds the D.C. level of the blocking diode whereupon a snap action circuit is energized to send a sharp negative pulse to a gate circuit to cut it off.

It is therefore a primary object of the invention to provide a new and improved radar system which has continuous range variation.

It is another object of the invention to provide a new and improved circuit for attenuating a sawtooth waveform.

It is still another object of the invention to provide a circuit wherein the attainment of a predetermined sawtooth height acts to cut off the circuit.

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

Figure 1:
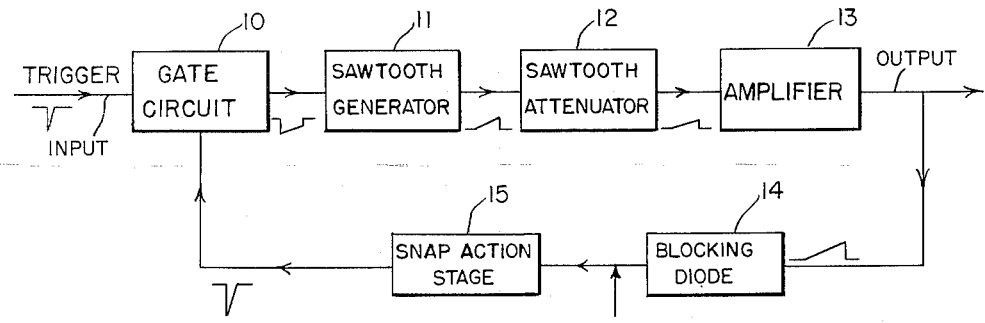
Fig. 1 is a block diagram of the circuit of the invention.

Referring now to the drawings there is shown in Fig. 1, which illustrates the preferred embodiment, a block diagram of the important components of the circuit. Starting at the left hand side in accordance with conventional practice a trigger pulse on the input conductor is received from a pulse generating means of any well known construction and applied to the input of the gate circuit 10. As will be hereinafter more particularly pointed out the gate circuit produces a gating pulse which is transmitted to the input of a sawtooth generator circuit 11. The output of the sawtooth generator is connected in turn to a sawtooth attenuator circuit 12 which attenuates the pulse. The sawtooth pulse then is sent in turn to amplifier 13 for transmission on the output conductor to the deflection coil of the cathode ray tube (not shown). The sawtooth voltage on the output conductor builds up until it exceeds the D.C. level of a blocking diode 14 which initiates a snap action stage 15 to send a sharp negative pulse back to the gate circuit to shut it off.

Figure 2:
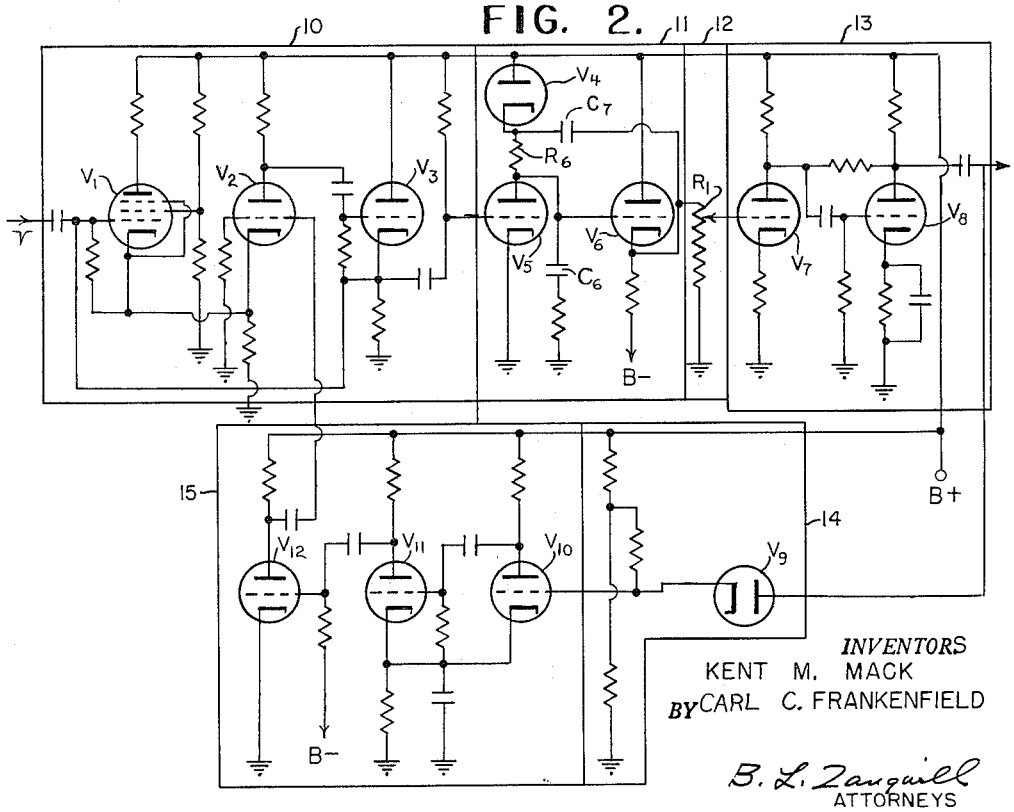
Fig. 2 is a schematic wiring diagram showing some of the details of the diagram of Fig. 1.

Fig. 2 illustrates in more detail the several component parts of the above discussed circuit. Tubes $V_1$ and $V_2$ are connected to form a "one shot" type of cathode coupled multivibrator to form gate circuit 10, which is initiated by receiving a trigger pulse to the grid of $V_1$. The output pulse of the gate circuit 10 is applied through cathode follower tube $V_3$ to the grid of $V_5$ to cut the same off and start the condenser $C_6$ charging through resistor $R_6$ whereby a sawtooth voltage is built up by the sawtooth generator 11 which includes tubes $V_4$, $V_5$, and $V_6$. The sawtooth attenuator 12 to continuously vary the slope of the sawtooth wave to a desired value comprises resistor $R_1$ connected as shown on the drawing between the cathode of $V_6$ and ground and having a variable arm connected to the grid of $V_7$. Sawtooth generator 11 is substantially shown in Fig. 7–15 of "Waveforms," by Chance et al., McGraw-Hill Book Co., 1949, and the operation is described on pages 267–270 of "Waveforms." The potential thus built up is applied to the grid of $V_7$ and amplified through $V_8$. $V_7$ and $V_8$ form amplifier 13 in Fig. 1. The height of the attenuated sawtooth is kept constant by maintaining the cathode of blocking diode $V_9$ at a fixed D.C. level. When the amplified voltage from $V_8$ exceeds this level the diode $V_9$ conducts and starts the snap action stage 15 consisting of amplifying stages $V_{10}$, $V_{11}$, $V_{12}$ which sends a sharp negative pulse back to the grid of $V_2$ which forms the other half of the multivibrator to cut it off. This causes $V_5$ to conduct thereby shorting condenser $C_6$ and returning the circuit to its original form.

Obviously many modifications and variations of the present invention are possible in the light of the above teachings. It is therefore to be understood that within the scope of the appended claims, the invention may be practiced otherwise than as specifically described.

What is claimed is:

1. In a pulse echo system in which pulses are periodically transmitted and received from objects in space a variable range circuit comprising in combination, input means for receiving a trigger signal, second means connected to said first mentioned means and responsive to said trigger pulse to generate a gating signal, third means connected to said second means and responsive to said gating signal to generate a sawtooth wave, fourth means connected to said third means to continuously attenuate the sawtooth wave, means connected to said fourth means to amplify the attenuated sawtooth wave, output means connected the last said means to receive the last said wave for transmittal to the deflection coil of a cathode ray tube, and a normally nonconducting diode having a predetermined bias, said diode being connected between said second means and said last named means, said bias being less in value than the maximum voltage of said sawtooth wave at the last named means whereby to terminate said gating signal when said bias is exceeded.

2. In a radio detection and ranging system a range circuit comprising in combination input means for receiving a trigger signal, second means connected to said first mentioned means and responsive to said trigger signal to generate a gating signal, third means connected to said second mentioned means and responsive to said gating signal to generate a sawtooth wave, means connected to said third means to continuously vary the slope of the sawtooth wave to a desired value, means coupled to said third mentioned means to amplify the output thereof, and a circuit connected between said second mentioned means and the amplified output of said last named means to terminate said gating pulse, said circuit including a blocking diode biased by a fixed source of direct current potential.

References Cited in the file of this patent

UNITED STATES PATENTS 2,414,486     Rieke                 Jan. 21, 1947

OTHER REFERENCES

Soller et al.: "Cathode Ray Tube Displays," Radiation Laboratory Series 22, 1948 edition, pages 139–145.